Patented Mar. 8, 1949

2,463,793

UNITED STATES PATENT OFFICE 2,463,793

PRODUCTION OF N⁴-ACETYL SULFGUANIDINES

Michel Marius Mosnier, Lyon, Rhone, France, assignor to Societe des Usines Chimiques Rhone-Poulenc, Paris, France, a French company No Drawing. Application November 14, 1945, Serial No. 628,665. In France November 24, 1944

6 Claims. (Cl. 260—397.7)

This invention relates to chemical compounds and to processes for producing the same. It concerns in particular the production from acylaminobenzenesulphonylcyanamides of certain novel intermediate products for use in the manufacture of acylaminobenzenesulphonylguanidines.

It is an object of this invention to provide new derivatives of acylaminobenzenesulphonylguanidines having utility as intermediates in the production of acetyl-sulphaguanidine and of other acylaminobenzenesulphonylguanidines. A further object of this invention is to provide a new and improved process for the manufacture of acylaminobenzenesulphonylguanidines which, as is well known, are convertible into therapeutically useful aminobenzenesulphonylguanidines, for example, sulphaguanidine.

Acylaminobenzenesulphonylcyanamides have the general formula:

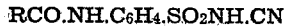

in which RCO denotes an acyl group. The hydrogen atom linked to the nitrogen adjacent the —CN— group exhibits an acid character, whence it follows that these compounds can undergo salt formation. It has now been found that if this property is utilised to make the corresponding ammonium or substituted ammonium salts, novel intermediate products of the general formula:

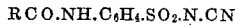

are obtained, which are convertible by heating to form acylaminobenzenesulphonylguanidines corresponding to the general formula:

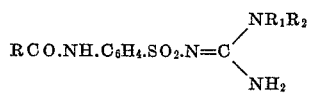

In the foregoing formulae, RCO denotes an acyl group, and $R_1$ and $R_2$ may be the same or different and denote radicals selected from the group consisting of hydrogen atoms and aliphatic, aromatic, alicyclic and heterocyclic radicals, or, together with the nitrogen atom to which they are attached, $R_1$ and $R_2$ may form part of a closed ring.

The novel ammonium or substituted ammonium salts can be prepared, for instance, from the corresponding calcium salts obtained by reaction between acylaminobenzenesulphochlorides and monocalcium cyanamide in the presence of an alkali, such as caustic soda or calcium hydroxide. These calcium salts can be converted by reaction with ammonia or with a primary or secondary amine in the presence of carbon dioxide. Alternatively, the desired salts can be obtained by double decomposition between the corresponding calcium salt and the carbonates of ammonium or of amines. In either case, the calcium carbonate formed is separated by filtration, and the cyanamide salts are isolated, for example, by crystallisation. They can be purified, if desired, by recrystallisation from alcohol.

The conversion, according to this invention, of the aforesaid ammonium or substituted ammonium salts into sulphonylguanidines is effected at a temperature varying according to the product, but in general lying above 130° C. The reaction may be carried out in the dry state but it is also possible to operate in the presence of a liquid, which makes it possible to obtain more easily a uniform temperature of the reactant mass. Liquids suitable for this purpose are, for example, water, ethyl alcohol, anisole and acetamide.

With the object of illustrating the invention without restricting it in any way, specific embodiments thereof will now be described.

Example 1

Double decomposition is effected between aqueous solutions of the calcium salt of para-acetylamino-benzenesulphonylcyanamide and of ammonium carbonate. After filtration of the calcium carbonate which has been precipitated, the aqueous solution obtained is crystallised. The crystalline salt thus obtained is heated to 150–170° C. when it first melts and then congeals into a mass, a rise of temperature being observed. The mass obtained is ground, malaxated with its own weight of water, filtered, washed and dried. There is thus obtained with a substantially quantitative yield p-acetylamino-benzenesulphonylguanidine, melting at 268–270° C.

Example 2

A 50% aqueous solution of the ammonium salt of p-acetylamino-benzenesulphonylcyanamide is heated in an autoclave to 150–155° C. for 2 hours. On cooling, the insoluble p-acetylamino-benzenesulphonylguanidine thus obtained with a good yield, is collected by filtration.

Example 3

A suspension in ethyl alcohol of the ammonium salt of p-acetylamino-benzenesulphonylcyanamide is heated in an autoclave to 150–160° C. for 2 hours. After cooling, the p-acetylamino-benzenesulphonylguanidine thus obtained with a good yield is filtered.

Example 4

The methylamine salt of p-acetylamino-benzenesulphonylcyanamide is prepared by double decomposition between the corresponding calcium salt and methylamine carbonate (itself obtained from methylamine and carbon dioxide), filtration of the calcium carbonate thereby precipitated, evaporation to dryness of the filtrate and crystallisation of the residue from ethyl alcohol. Conversion of the methylamine salt is effected by heating the salt to 170° C. After fusion and subsequent solidification there is obtained, in substantially quantitative yield, p-acetylamino-benzenesulphonylmethylguanidine melting at 256° C.

Example 5

The diethylamine salt of p-acetylamino-benzenesulphonylcyanamide is prepared from the calcium salt of p-acetylamino-benzenesulphonylcyanamide, diethylamine and carbon dioxide. After filtration of the resulting calcium carbonate, evaporation of the filtrate to dryness and crystallisation of the residue from alcohol, there is obtained the well crystallised diethylamine salt. Conversion of this salt is effected by heating to 170° C. and there is obtained in substantially quantitative yield p-acetylamino-benzenesulphonyldiethylguanidine. The product recrystallised from alcohol melts at 186° C.

In place of the methylamine salt of Example 4 and of the diethylamine salt of Example 5, other amine salts may be employed.

Further representative examples are the corresponding salts of dimethylamine, ethylamine and of other primary or secondary aliphatic amines; the corresponding salts of aniline, diphenylamine and methylaniline and of other primary or secondary aromatic amines; the corresponding salts of such alicyclic amines as benzylamine and phenylethylamine and of such heterocyclic amines as furfurylamine; and the corresponding salts of compounds containing a cyclic nitrogen atom which exhibit basic character such, for example, as piperidine.

I claim:

1. Process for the production of para-acetylaminobenzenesulphonylguanidines which consists in heating a member of the class consisting of the ammonium and amine salts of para-acetylaminobenzenesulphonylcyanamides.

2. Process for the production of para-acetylaminobenzenesulphonylguanidines which consists in heating an ammonium salt of a para-acetylaminobenzenesulphonylcyanamide.

3. Process for the production of para-acetylaminobenzenesulphonylguanidines which consists in heating at a temperature above 130° C. a member of the class consisting of the ammonium and amine salts of para-acetylaminobenzenesulphonylcyanamides.

4. Process for the production of para-acetylaminobenzenesulphonylguanidines which consists in heating at a temperature above 130° C. an ammonium salt of a para-acetylaminobenzenesulphonylcyanamide.

5. Process for the production of para-acetylaminobenzenesulphonylguanidines which consists in heating in a liquid medium a member of the class consisting of the ammonium and amine salts of para-acetylaminobenzenesulphonylcyanamides.

6. Process for the production of acetyl-sulphaguanidine which consists in heating the ammonium salt of para-acetylamino-benzenesulphonylcyanamide to a temperature of 150 to 170° C., and purifying the reaction product thus obtained.

MICHEL MARIUS MOSNIER.

REFERENCES CITED

The following references are of record in the file of this patent:

UNITED STATES PATENTS

| Number | Name | Date |
|---|---|---|
| 2,380,006 | Winnek et al. | July 10, 1945 |

OTHER REFERENCES

Winnek et al., Jour. Am. Chem. Soc. 64, (1942), pp. 1682–1685.